US006590580B2

(12) United States Patent
Horikawa et al.

(10) Patent No.: US 6,590,580 B2
(45) Date of Patent: Jul. 8, 2003

(54) DATA CREATION DEVICE FOR IMAGE DISPLAY AND RECORD MEDIUM

(75) Inventors: Kentaro Horikawa, Hokkaido (JP); Tetsunori Saito, Hokkaido (JP)

(73) Assignee: Konami Corporation, Tokyo (JP)

( * ) Notice: Subject to any disclaimer, the term of this patent is extended or adjusted under 35 U.S.C. 154(b) by 359 days.

(21) Appl. No.: 09/741,478

(22) Filed: Dec. 19, 2000

(65) Prior Publication Data

US 2001/0023200 A1 Sep. 20, 2001

(30) Foreign Application Priority Data

Jan. 12, 2000 (JP) ....................................... 2000-004103

(51) Int. Cl.[7] ................................................ G06T 17/00
(52) U.S. Cl. ....................................................... 345/589
(58) Field of Search ................................. 345/418, 419, 345/420, 422, 589, 590, 591

(56) References Cited

U.S. PATENT DOCUMENTS

| | | | | |
|---|---|---|---|---|
| 5,270,687 A | | 12/1993 | Killebrew, Jr. | |
| 5,537,579 A | | 7/1996 | Hiroyuki | |
| 5,864,342 A | * | 1/1999 | Kajiya et al. | 345/418 |
| 5,867,178 A | | 2/1999 | Murphy et al. | |
| 5,883,632 A | * | 3/1999 | Dillinger | 345/589 |
| 6,417,861 B1 | * | 7/2002 | Deering et al. | 345/589 |

FOREIGN PATENT DOCUMENTS

EP 0 189 567 8/1986

OTHER PUBLICATIONS

Laid–Open Patent Publication No. S61–184589, published Aug. 18, 1986.

Laid–Open Patent Publication No. H06–067646, entitled Image Processing System, By Takaaki et al., published Mar. 11, 1994.

Laid–Open Patent Publication No. H08–063141, entitled Color Image Display Method and Video Game Device Using the Same, By Kazutaka et al., published Mar. 8, 1996.

* cited by examiner

*Primary Examiner*—Cliff N. Vo
(74) *Attorney, Agent, or Firm*—Bachman & LaPointe, P.C.

(57) ABSTRACT

A data creation device for image display which generates data for image display to display a plurality of target images each having a common display range on a display device, comprises: a first recording section to store a palette data which includes a plurality of color palettes and a code information, in which each of the plurality of color palettes includes a plurality of color informations, the code information includes a plurality of codes, and one of the plurality of codes specifies at least one color information of the plurality of color informations included in each of the plurality of color palettes; a second memory section to store an image data including the plurality of target images, in which the image data includes a the plurality of pixels, a position information concerns with a position of each of the plurality of pixels, one of the plurality of codes corresponds to the position information, and a palette information decides which palette is used among the plurality of palettes; and a drawing section to generate data for image display based on the palette data and the image data.

10 Claims, 7 Drawing Sheets

F I G. 4

| 0000 | 0001 | 0010 | 0011 | 0100 | 0101 | 0110 | 0111 |
|---|---|---|---|---|---|---|---|
| BG | BG | BG | BG | BG | BG | BG | BG |
| BG | BG | BG | BG | WT | WT | WT | WT |
| BG | BG | WT | WT | BG | BG | WT | WT |
| BG | WT | BG | WT | BG | WT | BG | WT |

| 1000 | 1001 | 1010 | 1011 | 1100 | 1101 | 1110 | 1111 |
|---|---|---|---|---|---|---|---|
| WT | WT | WT | WT | WT | WT | WT | WT |
| BG | BG | BG | BG | WT | WT | WT | WT |
| BG | BG | WT | WT | BG | BG | WT | WT |
| BG | WT | BG | WT | BG | WT | BG | WT |

F I G. 6

| 0000 | 0001 | 0010 | 0011 | 0100 | 0101 | 0110 | 0111 |
|---|---|---|---|---|---|---|---|
| BG | RD | BL | GR | BG | RD | BL | GR |
| BG | BG | BG | BG | RD | RD | RD | RD |

| 1000 | 1001 | 1010 | 1011 | 1100 | 1101 | 1110 | 1111 |
|---|---|---|---|---|---|---|---|
| BG | RD | BL | GR | BG | RD | BL | GR |
| BL | BL | BL | BL | GR | GR | GR | GR |

F I G. 7

| 0000 | 0001 | 0010 | 0011 | 0100 | 0101 | 0110 | 0111 |
|---|---|---|---|---|---|---|---|
| BG | RD | BL | GR | BG | RD | BL | GR |
| BG | BG | BG | BG | Y | Y | Y | Y |

| 1000 | 1001 | 1010 | 1011 | 1100 | 1101 | 1110 | 1111 |
|---|---|---|---|---|---|---|---|
| BG | RD | BL | GR | BG | RD | BL | GR |
| VL | VL | VL | VL | DB | DB | DB | DB |

DATA CREATION DEVICE FOR IMAGE DISPLAY AND RECORD MEDIUM

BACKGROUND OF THE INVENTION

1. Field of the Invention

The present invention relates to an image creation technology executed by a computer, especially, to an image creation technology performed by using a color palette.

2. Description of the Related Art

Various technologies are developed as a technology to output an image to a television receiver, a monitor receiver or a CRT display device in a home video game, a personal computer device, or a graphic computer device, etc. There is a technology, which uses a color palette, among them.

The color palette is one kind of tables created by allocating a plurality of different codes to each of color informations which are information relating to different kinds of colors among colors displayed on a display device. An image data of a target image which becomes a display target in case of using a color palette is created as a set of a position information and a code configured by assigning the above-mentioned code, which becomes a pair with the color to be displayed to a pixel, to each position information corresponding to a position in the target image. And, data for image display to display a desired image on the display device is created by drawing the color on the color palette decided by the above-mentioned code, which pairs with each pixel, to each pixel in the target image one by one based on this image data.

By the way, in the conventional technology, a color information with only one color is assigned to each code. Therefore, when it is necessary to display different kinds of a plurality of images, it is necessary to create data for display by generating the image data of each image which is intended to display as described above, and drawing a suitable color corresponding to each pixel in the corresponding image.

Here, a creation of different image data for each target image means that an amount of necessary data becomes huge. This disadvantage especially becomes remarkable when there are a lot of target images to be displayed. Therefore, a technology, which can display a lot of images with a little amount of data by compressing the image data, is required.

SUMMARY OF THE INVENTION

An object of the present invention is to create data for display with reducing an amount of data of an image data by improving the technology concerning the data creation for display performed with a color palette.

To achieve the above-mentioned object, the following data creation device for display is proposed according to the present invention.

A data creation device for image display which generates data for image display to display a plurality of target images each having a common display range on a display device, comprises: first recording means to store a palette data which includes a plurality of color palettes and a code information, in which each of the plurality of color palettes includes a plurality of color informations, the code information includes a plurality of codes, and one of the plurality of codes specifies at least one color information of the plurality of color informations included in each of the plurality of color palettes; second memory means to store an image data including the plurality of target images, in which the image data includes a the plurality of pixels, a position information concerns to a position of each of the plurality of pixels, one of the plurality of codes corresponds to the position information, and a palette information decides which palette is used among the plurality of palettes; and drawing means to generate data for image display based on the palette data and the image data. In the above-mentioned data creation device, a number of the plurality of color palettes is the same as a number of the plurality of target images. In the above-mentioned data creation device, the drawing means allocates a color to each pixel based on the code information and the palette information corresponding to the position information on each pixel.

In the data creation device for image display according to the present invention, a plurality of color palettes, in which the number of color informations included therein is assumed to be the same, are prepared. That is, in this data creation device for image display, by associating one of color informations included in the plurality of color palettes with one code, respectively, a plurality of color informations are associated.

The advantages are as follows. If the color palette is constructed as described above, it becomes possible to make the image data of each target image common. In a word, each color palette differs from each other according to the invention, even if the image data of each target image is common, it becomes possible to display a different image.

As a result, a big compression of image data becomes possible. For example, if the image data to display four target images is assumed to be common, it becomes possible to compress the image data into a size of ¼. Of course, to obtain this advantage, it is necessary that a display range of each target image defined by a pixel is mutually common. However, the present invention is extremely useful as long as it satisfies this requirement.

For example, when each of a plurality of target images displays a character, it is easy to satisfy a condition that the display range defined by the pixel is mutually common for each target image, and an application of the present invention thereto is easy.

The number of codes according to the present invention can be equal to or less than the Y power of X, when the color displayed to the pixel number is X, and the number of the plurality of target images is Y. It becomes possible to correspond to all of the permutation of plurality of color informations associated with one code of like this. To correspond to all of this permutation, it is sufficient that the number of color information is set to Y power of X under the definition as mentioned-above, thereby an amount of data of the palette data can be reduced to the minimum.

In the above-mentioned data creation device, the number of the codes is 16, and the number of colors is 2 and the number of the plurality of target images is 4. When the plurality of target images displayed by two colors are displayed, it becomes possible to compress the image data into ¼ according to this. This is suitable, for example, that the target image is an image to display a character capable of being displayed by two colors of white and black. In the above-mentioned data creation device, the number of the codes is 16, and the number of colors is 4 and the number of the plurality of target images is 2. In the above-mentioned data creation device, at least one different color is included in at least two color palettes. This means it becomes possible to compress the image data into ½ when the plurality of target images displayed by four colors are displayed. Both of them can be easily achieved as an application of a general-purpose 16 colors palette.

A 'color' used in the specification includes a transparent color such as colorless transparency, translucency, and colored transparency, in addition to a color in chromatics defined by hue, brightness and color saturation.

The data creation device for image display according to the present invention as explained above can be achieved by reading a program code recorded on a record medium to a predetermined computer, for example, such as a computer device only for a game only computer device or and a home computer device.

An example of the record medium is as follows.

An article of manufacture comprising: a computer usable medium having computer readable program code means embodied therein for causing data for image display to display a plurality of target images each having a common display range on a display device to be generated, the computer readable program code means in the article of manufacture comprises: computer readable program code means for causing a computer to store a palette data which includes a plurality of color palettes and a code information, in which each of the plurality of color palettes includes a plurality of color informations, the code information includes a plurality of codes, and one of the plurality of codes specifies at least one color information of the plurality of color informations included in each of the plurality of color palettes; computer readable program code means for causing a computer to store an image data including the plurality of target images, in which the image data includes a the plurality of pixels, a position information concerns with a position of each of the plurality of pixels, one of the plurality of codes corresponds to the position information, and a palette information decides which palette is used among the plurality of palettes; and computer readable program code means for causing a computer to generate data for image display based on the palette data and the image data.

A program code according to the specification includes a concept which includes data and a control parameter, etc. necessary to display the image on the display device in addition to the program.

As is clear from the above-mentioned explanation, according to the data creation device for image display of the present invention, since the image data necessary to display the plurality of target images to be common becomes possible, it becomes possible to reduce an amount of data necessary to display the plurality of target images.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a figure, which conceptually shows an example of a color palette;

FIG. 6 is a figure, which conceptually shows an example of a color palette; and FIG. 7 is a figure, which conceptually shows an example of a color palette.

DESCRIPTION OF THE PREFERRED EMBODIMENT

Figure 1:
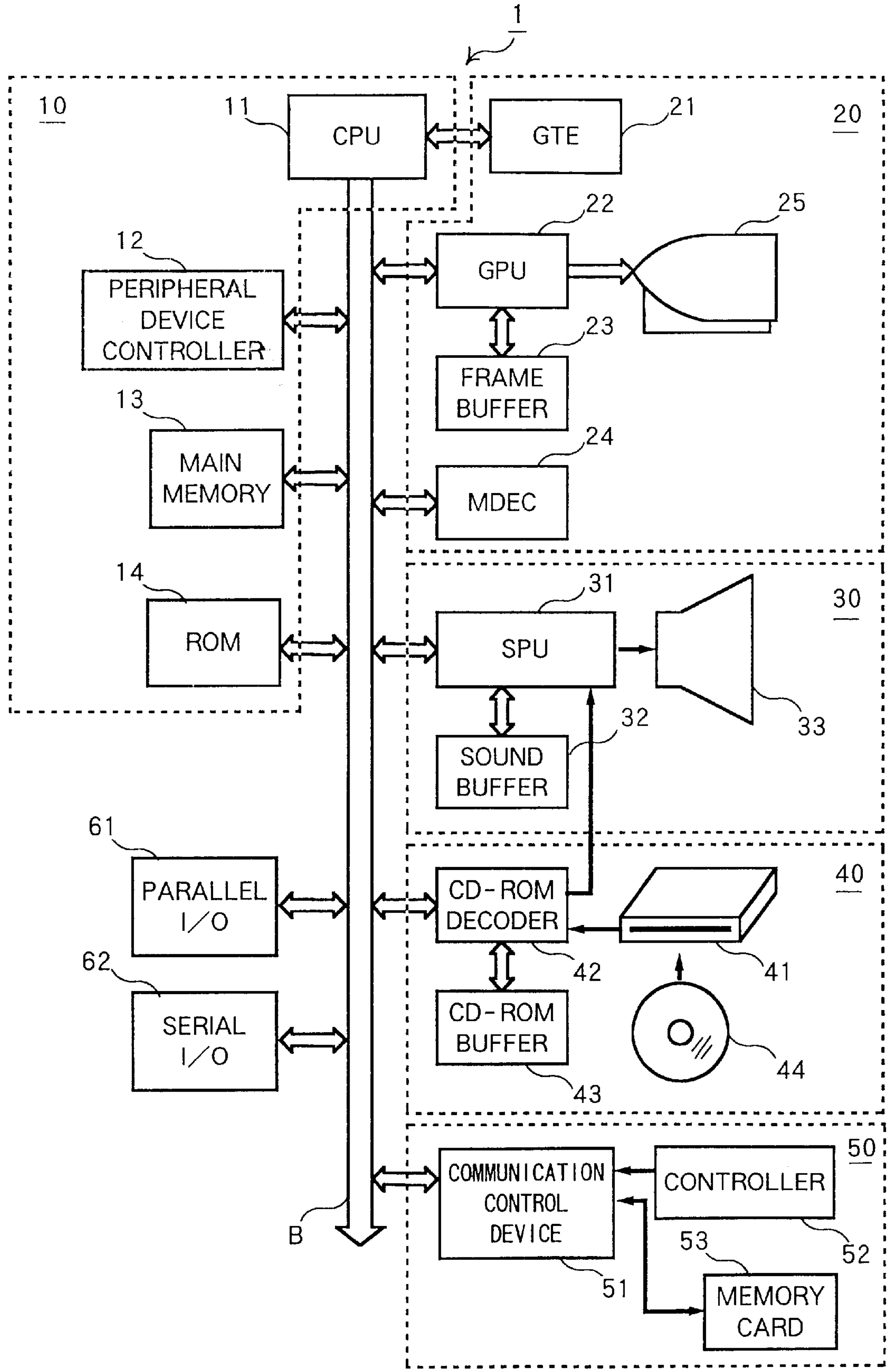
FIG. 1 is a hardware configuration, which shows an example of a game device main body to which present invention is applied.

A data creation device for image display according to the embodiment is constructed as a game device main body 2, which is a part of the following video game devices 1. A specific example of a configuration of the game device main body 2 is as shown in FIG. 1. The game device main body 2 comprises, for example, a main controller 10, an image processing section 20, an acoustic processing section 30, a disk controller 40, a communication controller 50, and a main bus B to connect each of above-mentioned function blocks 10 to 50 with being possible to communicate interactively.

The main controller 10 comprises a CPU 11, a peripheral device controller 12 which performs an interrupt control and a DMA (direct memory access) transfer control, etc., a main memory 13 which temporarily stores a game program and a production expression data, an image processing section 20, and a ROM 14 storing such as an operating system (OS), which manages an acoustic processing section 30, etc. The CPU 11 is a RISC (reduced instruction set computer) CPU, and controls a basic operation of the entire device by executing the OS stored on ROM 14. In addition, the CPU 11 achieves a plurality of function blocks described later by executing the game program on the main memory 13.

The image processing section 20 comprises a geometry transfer engine (GTE) 21 which performs a coordinate conversion for a data stored on the main memory 13 etc. at high speed, a graphics processing unit (GPU) 22 which performs a drawing processing of a three dimensional CG image which consists of combinations of a polygon and a sprite (the polygon including triangular and quadrangle, etc., hereafter, the sprite is assumed to be included to the concept of the polygon), etc. based on a drawing instruction from the CPU 11, a frame buffer 23 which temporarily stores a three dimensional CG image to which the drawing processing is performed by the GPU 22, and an image decoder (MDEC) 24 which decodes a compressed image data if necessary. A display device 25 reads and displays the three dimensional CG image stored on the frame buffer 23.

It becomes possible to display the three dimensional CG image which includes a moving image element on the display device 25 by continuously performing the above-mentioned drawing processing by the GPU 22 and the storage on the frame buffer 23.

The acoustic processing section 30 comprises a sound reproduction processing processor (SPU) 31 which creates an effect sound, a voice, and a tone, etc., based on a background environmental data according to an acoustic, a sound buffer 32 to temporarily store a data such as the effect sound and other sound source data, and a speaker 33 which outputs the effect sound etc. created by the SPU 31. The SPU 31 has, for example, an ADPCM decoding function to reproduce a sound source data with an adaptive differential coding (ADPCM), a function to reproduce an effect sound etc. by reproducing a stored sound source data on the sound buffer 32, and a modulation function, which modulates and reproduces a stored sound source data on the sound buffer 32 etc. By comprising such functions, in the acoustic processing section 30, it becomes possible to use the sound source data stored on the sound buffer 32 as a sampling sound source which creates the effect sound etc.

The disk controller 40 comprises a disk drive device 41 to reproduce a game program and an image data etc. corresponding to the content of the game recorded on a CD-ROM 44 (hereafter, called a "reproduced data" to a "reproduction data"), a CD-ROM decoder 42 which decodes an error correction code (ECC), when the error correction code (ECC) is added to the reproduction data, and a buffer 43 to temporarily store the reproduction data from the disk drive device 41 before storing it on the main memory 13. The decoder 42 also constructs a part of the acoustic processing section 30. An audio output of this decoder 42 enters the SPU 31 once, is mixed with this output of the SPU 31, and becomes the final audio output via reverberation unit.

The communication controller 50 comprises a communication control device 51 which controls a communication with the CPU 11 through the main bus B, a controller 52 which inputs an instruction from a game person, and a memory card 53 which records a setting etc. of the game.

The controller 52 is an interface component to input an intention of the game person, comprises a start key which directs a game start, a reset key which directs a game reset, a selection key which directs top and bottom and right and left movement of a character and coincides a cursor with displayed various menus and items, and an instruction key to perform a decision of a detailed operation instruction of the character and an instruction of a selected menu, etc., and transmits a state of each of these keys to the communication control device 51 by a synchronous communication.

The communication control device 51 transmits the state of each key of the controller 52 to the CPU 11. With this configuration, the instructions from the game person are informed to the CPU 11, and the CPU 11 performs the image display and the game development processing according to the instruction from the game person based on the game program which is executed.

When it is necessary to record a setting of the game which progresses according to the scenario and the results at end of the game or on the way etc., the CPU 11 transmits various data of that time to the communication control device 51. The communication control device 51 records the transmission data from the CPU 11 on the memory card 53. The memory card 53 can be attached and detached in a state of turning on the power supply, since it is separated from the main bus B. With this configuration, the setting of the game etc. can be recorded on a plurality of memory cards 53.

The game device main body 2 comprises a parallel input/output (I/O) port 61 connected with the main bus B and a serial input/output (I/O) port 62. Then, the game device main body 2 can be connected with the peripheral devices through the parallel I/O port 61, and the game device main body 2 can communicate with other video game devices etc. through the serial I/O port 62.

In the game device main body 2 of the above-mentioned configuration, when the power supply is turned on or the reset processing is performed in a state of setting the CD-ROM 44, which corresponds to a record medium according to the present invention, to the disk drive device 41, the CPU 11 executes the OS recorded on the ROM 14. When the OS is executed, the CPU 11 performs an initialization of the entire devices such as an operation confirmation, controls the disk controller 40, reads the game program recorded on the CD-ROM 44 to the main memory 13, and executes the game program. The CPU 11 forms a function block shown in FIG. 2 and achieves the video game device 2 by executing this game program.

Figure 2:
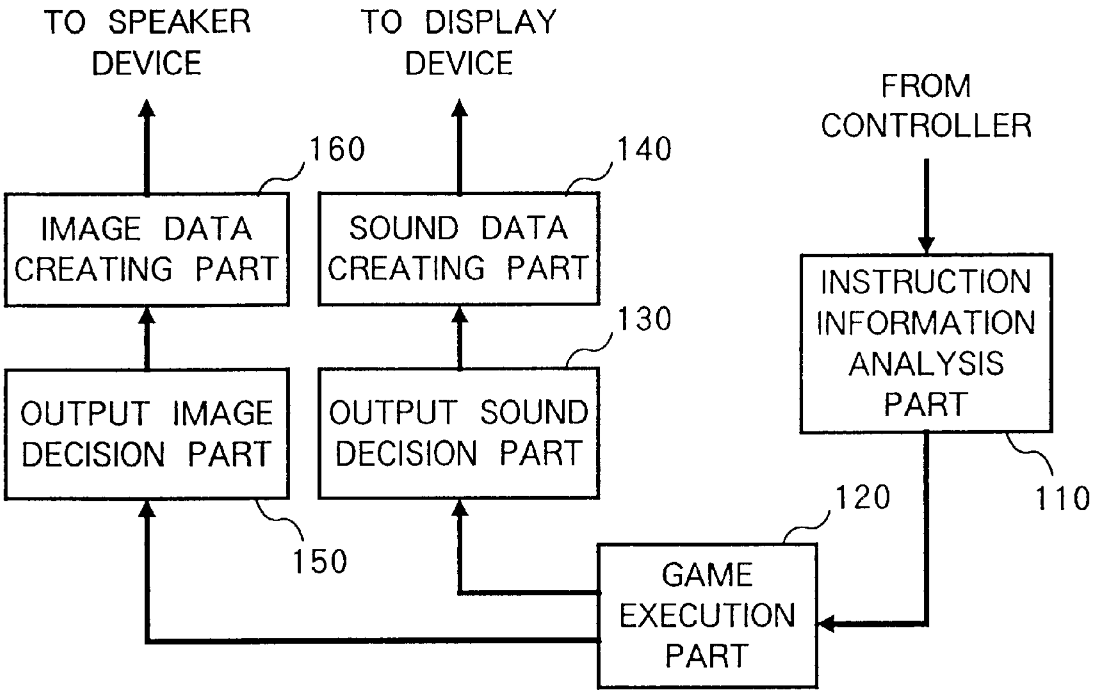
FIG. 2 is a function block diagram, which shows an example of a configuration of a game device main body according to the embodiment of the present invention.

As shown in FIG. 2, the video game device 2 according to the embodiment is constructed by including each of function blocks of an instruction information analysis section 110, a game execution section 120, an output sound decision section 130, a sound data creation section 140, an output image decision section 150, and an image data creation section 160.

The instruction information analysis section 110 is connected with the controller 52, and distinguishes the content of the operation input from the controller 52 by the operation of the game person. The game execution section 120 is connected with an instruction information analysis section 210, and decides how to develop the game based on the content of the operation sent from the instruction information analysis section 210, a predetermined game scenario, and a predetermined game rule, etc. The output sound decision section 130 decides a sound to be output from the speaker 33 based on a decision of the game execution section 120. The sound data creation section 140 creates a sound data to output a desired sound from the speaker 33 based on a decision of the output sound decision section 130.

On the other hand, the output image decision section 150 decides an image to be displayed on the display device 25 based on a decision of the game execution section 120. The image data creation section 160 creates an image data to display a desired image on the display device 23 based on a decision of the output image decision section 150. The image data creation section 160 is chiefly configured by a cooperation of the above-mentioned main controller 10 and image processing section 20. Then, the CPU 11, which reads a data to create an image from the main memory 13, overlaps the image based on this image data according to priority, thereby image data, which defines the image to be finally displayed on the display device 25, is created.

Figure 3:
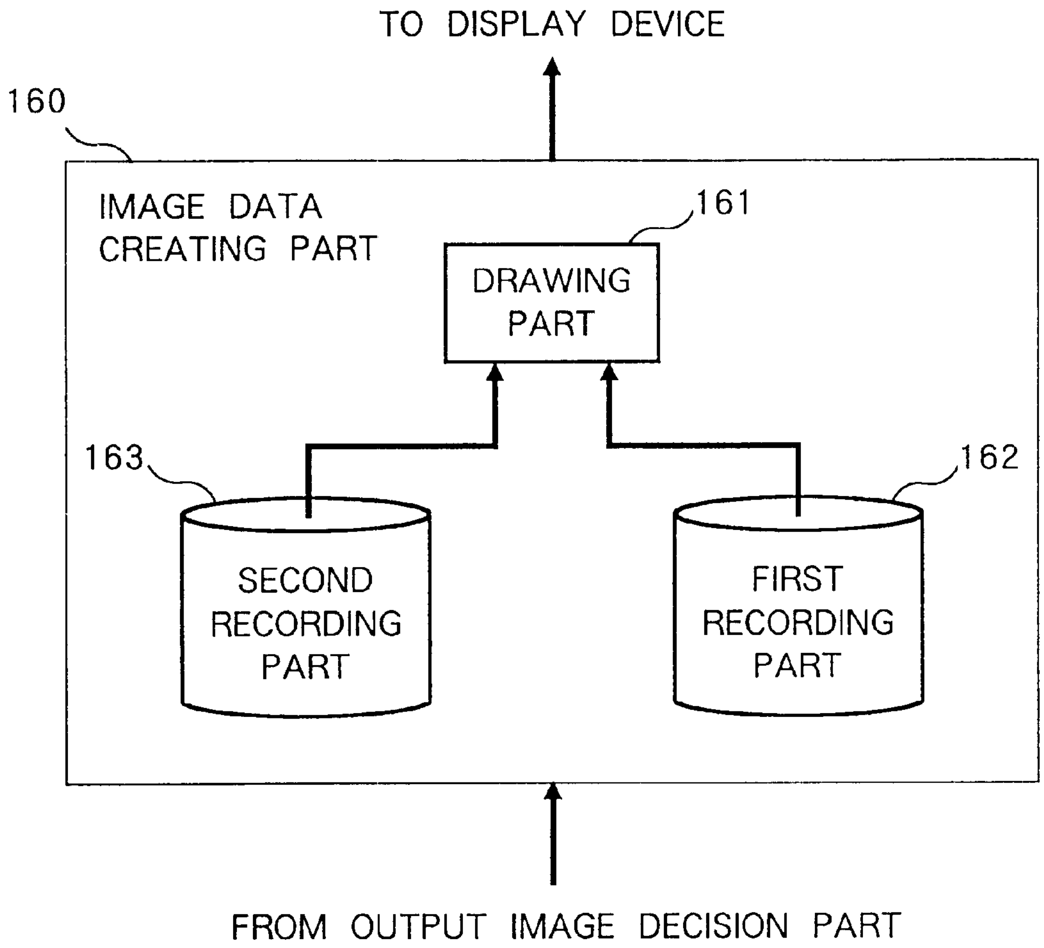
FIG. 3 is a function block diagram, which shows a configuration of a sound data creation section shown in a function block diagram of FIG. 2 in detail.
Figure 5A:
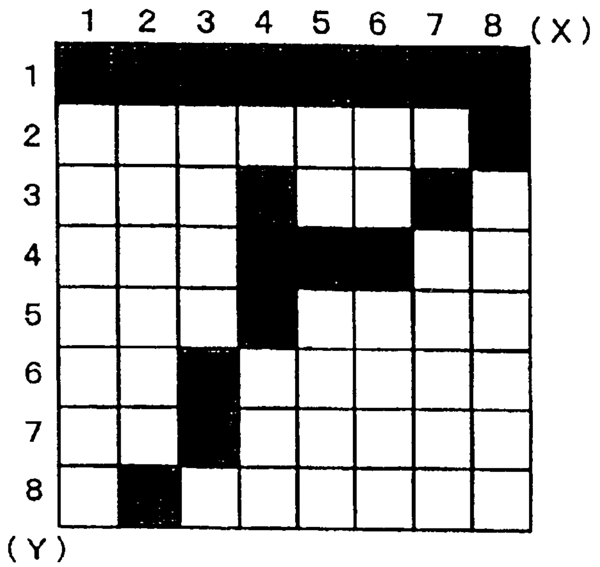
FIG. 5 is a figure to explain an example of an example of a creation of image data.
Figure 5B:
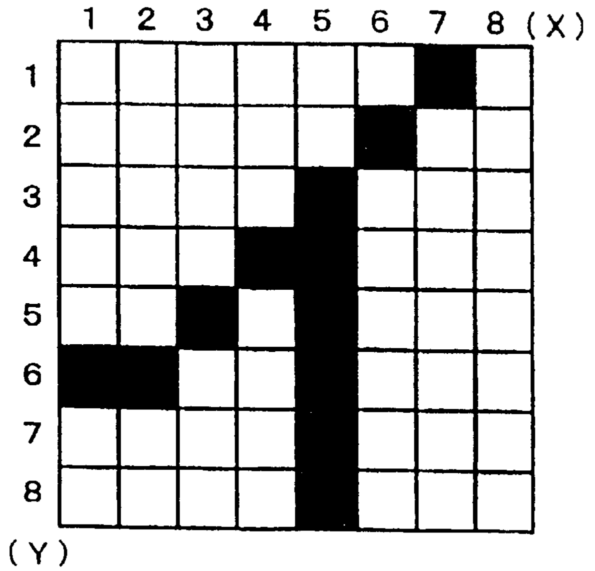
Figure 5C:
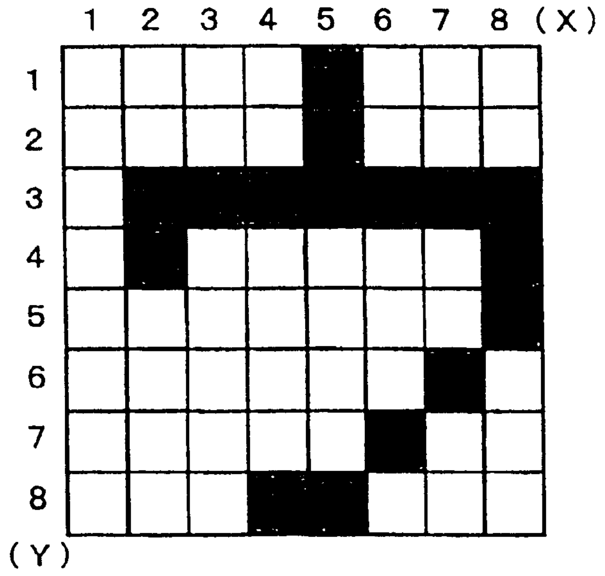
Figure 5D:
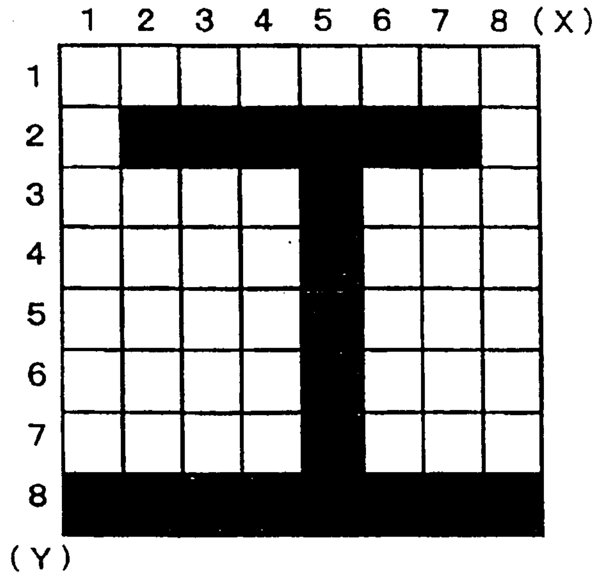

Specifically, the image data creation section 160 includes a drawing section 161 which functions as drawing means of the present invention, a first memory section 162 which functions as first recording means of the present invention, and a second record section 163 which functions as second recording means of the present invention in detail as shown in FIG. 3.

The palette data of the color palette is recorded on the first record section 162.

The palette data recorded on the first record section 162 is assumed to be the data concerning the plurality of color palettes. And, each palette data includes a color information to decide a color displayed to a pixel of the target image and a code information for a code assigned respectively of the corresponding color information as a pair. The palette data is set so that the number of color informations included in each palette becomes the same number, and the number of palettes becomes the same number as the number of the target images to be displayed. Above-mentioned code information corresponds to one of color informations in each palette for each code, respectively and each of the codes corresponds to each color palette.

FIG. 4 conceptually shows an example of the plurality of color palettes defined by the palette data.

The color palette conceptually shown in FIG. 4 includes two colors of background (hereinafter, called as a "BG") and white (hereinafter, called as a "WT") as a color to be displayed for each pixel. Information to display the BG and information to display the WT are color informations defined in the present invention. Then, the color palette defined in the present invention is formed, so that 16 color informations included in one horizontal line in FIG. 4 as a set. In a word, four color palettes exist in this example. Each color palette is assumed to be a first palette, a second palette, a third palette, and a fourth palette in an order from an upper line in FIG. 4, in this example.

The figure of four digits, which is described on an upper line than four color palettes, corresponds to the code defined in the present invention. This code can specify one of color informations included in each color palette and corresponds to each color palette. That is, one of color informations can be specified by specifying this code and specifying which palette of the first palette to the fourth palette is used.

An order of color information assigned to each code (order of color informations which line along the vertical direction in FIG. 4) assumed to be mutually different.

The image data to create image data, to which a desired image is displayed on the display device 25, is recorded on the second record section 163. This image data is recorded with only the number of target images, which become a target to be displayed. The size of each target image (display range defined by pixels) of this image data is equal to each other. The image data in this example is used to display a character, and, for example, an image with 256×256 pixels is displayed.

The image data for each image is constructed as data which shows a lot of "pairs of data", each of which consists of a position information on a position on the target image and a code information assigned to this position information, respectively. The code information is information that a color decided by the color information specified by the code information corresponds to a color to be displayed at a position specified by the above-mentioned position information. This data is common for all images as explained later.

The number of target images corresponds to the number of color palettes. In the embodiment, since the color palettes are four as described above, the number of target images is four. And, each target image is associated with either one of the above-mentioned color palette of one to one correspondence and the data to decide which color palette is used is included in the data of each target image when drawing.

In a word, the image data for each target image includes the data to decide the color palette used when drawing and the data to concern color information in the color palette with a display position of each pixel.

An example of an image data will be explained referring to FIG. 5. This example shows a case which displays four characters of ".", ".", ".", and ".", which are Japanese characters, as shown in FIG. 5. It is assumed that the image displayed by the data of this example has a common range with eight pixels×eight pixels and the part shown in the gray corresponds to 'WT', and the part shown in white corresponds to 'BG', that is, transparency, respectively, for easiness.

In this example, pixels in which X coordinates and Y coordinates of each of a character of "." shown by (a), a character of "." shown by (b), a character of "." shown by (c), and a character of "." shown by (d) are 1, respectively, are paid attention (Hereafter, a coordinate is denoted as (1, 1)). The colors of coordinates (1, 1) are 'WT', 'BG', 'BG', and 'BG', respectively. The code corresponding to the order of the color information of the arrangement of this color is "1000" according to a conceptual diagram of the color palette shown in FIG. 4. Therefore, the code corresponding to position information of coordinates (1, 1) becomes 1000 (This is denoted as (1, 1, 1000)). A similar expression will be used as follows).

Similarly, it can be denoted for the coordinate (2, 1) as (2, 1, 1000). The color order can be denoted for coordinates (5, 1) as 'WT', 'BG', 'WT' and 'BG' as (5, 1, 0101). The color order can be denoted for the coordinate (3,5) as (3, 5, 0111), since the color order is 'BG', 'WT', 'WT', and 'WT'.

As described above, either one of the codes in the color palette corresponds to all position information. The image data to display four characters of ".", ".", ".", and "." is created as a set. Therefore, according to the embodiment, only one data to concern the position information to specify the position on the target image with the color information is required among the image data to display four images, image data can be compressed into ¼.

Each image data includes the data which of the above-mentioned first palette to the fourth palette should be used when drawing. In the embodiment, the first palette, the second palette, the third palette and the fourth palette are used, respectively, to display the character of ".", to display the character of ".", to display the character of "." and to display the character of ".", and the data to specify this relationship is included in each image data.

It is naturally possible to perform an efficient compression of the image data by creating the above-mentioned image data as a set of four target images for a Katakana, a Hiragana, a Chinese character, an alphabet, a sign, and a figure, etc., other than ".", ".", "." and "."

The drawing section 161 reads the image data of one of the plurality of target images if necessary, and generates data for image display by allocating the color decided depending on the color information which becomes a pair with the code associated with the position information at the position of the corresponding pixel to each of the pixel in the corresponding target image according to this image data.

In the embodiment, the data to draw the image to be displayed on the display device is generated by deciding the color palette to be used based on the above-mentioned data included in the read image data to decide which color palette is used when drawing and by allocating the color based on the color information associated with the code information assigned to each of the position information on the pixel at the position one by one.

As described in more detail, the drawing section 161 according to the embodiment has the following functions. That is, this drawing section 161 receives the decision from the output image decision section 150 and starts reading of the image data of the target image for image data creation. For example, when the output image decision section 150 decides to display the character of "." in an example of FIG. 5, the drawing section 161 receives the information from the output image decision section 150, reads the information of the common above-mentioned image data like a "." to "." from the first record section based on this, and decides use of the second palette to draw. The drawing section 161 draws the color decided based on the color information specified by the code associated with each position information based on this image data. As a result, the reproduced image becomes the image of "." shown in FIG. 4.

The drawing section 161 performs all processings necessary to decide the image displayed on the display device 25 such that the background images other than the target image is drawn and the position of the target image in all images is decided. For example, the drawing section 161 generates the image data of the image to be finally displayed on the display device 25 by executing the processing of overlapping the images based on the generated data as mentioned-above and a half transparency processing etc.

Thus, the creation of data for image display is performed.

In the above-mentioned explanation, it is assumed the first record section 162 includes the palette data of the color palette including two color information in each of 16 color information sets, but it takes the place of this, it is also possible to record the palette data for the color palette as shown in FIG. 6 and FIG. 7 on the first record section 162. Both of them include the two color palettes, and common image data can be used for two target images.

In the color palette shown in FIG. 6, only color information to display four colors of 'BG', 'Red', 'Blue' and 'Green' are included in each of color information sets. When a color necessary to display each target image is common, this color palette is useful.

On the other hand, in the color palette shown in FIG. 7, the color information to display four colors of 'BG' and 'RD' (Red) 'BL' (Blue) and 'GR' (Green) are included at an upper line used to display one target image, and the color information to display four colors of 'BG' and 'Y' (Yellow) 'VL' (Violet) and 'DB' (Dark Blue) are included at a lower line used to display another target image. When a necessary color to be displayed is different, this color palette is useful in one target image and another target image.

It is needless to say the color shown in FIG. 6 and FIG. 7 is an example, and it is possible to use the color excluding this.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data creation device for image display which generates data for image display to display a plurality of target images each having a same display range on a display device, comprising:

first recording means to store a palette data which includes a plurality of color palettes and a code information, each of said plurality of color palettes including a plurality of color informations, said code information including a plurality of codes, and one of said plurality of codes specifying at least one color information of said plurality of color informations included in each of said plurality of color palettes;

second memory means to store an image data including said plurality of target images, said image data including a plurality of pixels, a position information concerning with a position of each of said plurality of pixels, one of said plurality of codes corresponding to said position information, and a palette information deciding which palette is used among said plurality of palettes; and drawing means to generate data for image display based on said palette data and said image data.

2. The data creation device for image display according to claim 1, wherein a number of said plurality of color palettes is the same as a number of said plurality of target images.

3. The data creation device for image display according to claim 1, wherein said drawing means allocates a color to each pixel based on the code information and the palette information corresponding to the position information on each pixel.

4. The data creation device for image display according to claim 1, wherein a number of said codes is equal to or less than $X^Y$, when a number of colors displayed to a pixel in the plurality of target images is X, and a number of the plurality of target images is Y.

5. The data creation device for image display according to claim 4, wherein the number of said codes is 16, and the number of colors is 2 and the number of the plurality of target images is 4.

6. The data creation device for image display according to claim 4, wherein the number of said codes is 16, and the number of colors is 4 and the number of the plurality of target images is 2.

7. The data creation device for image display according to claim 6, wherein at least one different color is included in at least two color palettes.

8. The data creation device for image display according to claim 1, wherein one of the colors, which is displayed, is transparent.

9. The data creation device for image display according to claim 1, wherein each of said target image is an image showing a character.

10. An article of manufacture comprising:

a computer usable medium having computer readable program code means embodied therein for causing data for image display to display a plurality of target images each having a common display range on a display device to be generated, the computer readable program code means in said article of manufacture comprising:

computer readable program code means for causing a computer to store a palette data which includes a plurality of color palettes and a code information, each of said plurality of color palettes including a plurality of color informations, said code information including a plurality of codes, and one of said plurality of codes specifying at least one color information of said plurality of color informations included in each of said plurality of color palettes;

computer readable program code means for causing a computer to store an image data including said plurality of target images, said image data including a the plurality of pixels, a position information concerning to a position of each of said plurality of pixels, one of said plurality of codes corresponding to said position information, and a palette information deciding which palette is used among said plurality of palettes; and computer readable program code means for causing a computer to generate data for image display based on said palette data and said image data.

* * * * *